United States Patent
Nozu

(10) Patent No.: US 6,809,433 B2
(45) Date of Patent: Oct. 26, 2004

(54) CAPACITOR UNIT WITH ELECTRIC DOUBLE LAYER CAPACITORS, CONTROL METHOD AND CONTROL APPARATUS FOR THE SAME, AND ACCUMULATOR SYSTEM FOR MOTOR VEHICLES

(75) Inventor: Ryutaro Nozu, Chiba (JP)

(73) Assignee: Nisshinbo Industries Inc., Tokyo (JP)

(*) Notice: Subject to any disclaimer, the term of this patent is extended or adjusted under 35 U.S.C. 154(b) by 97 days.

(21) Appl. No.: 10/189,735

(22) Filed: Jul. 8, 2002

(65) Prior Publication Data

US 2003/0020334 A1 Jan. 30, 2003

(30) Foreign Application Priority Data

Jul. 19, 2001 (JP) ........................................ 2001-220397

(51) Int. Cl.[7] .............................. H02M 7/00; H02M 7/19
(52) U.S. Cl. ........................ 307/109; 307/110; 363/59; 363/60
(58) Field of Search .................. 307/109, 110; 363/59, 60

(56) References Cited

U.S. PATENT DOCUMENTS

| | | |
|---|---|---|
| 5,713,426 A | 2/1998 | Okamura |
| 5,783,928 A | 7/1998 | Okamura |
| 5,977,748 A * | 11/1999 | Okamura ................... 320/118 |
| 5,982,050 A * | 11/1999 | Matsui ...................... 307/10.7 |
| 6,316,917 B1 * | 11/2001 | Ohta .......................... 320/166 |
| 6,327,137 B1 * | 12/2001 | Yamamoto et al. ......... 361/517 |

FOREIGN PATENT DOCUMENTS

| | | |
|---|---|---|
| EP | 0 795 947 A | 9/1997 |
| EP | 1 035 627 A1 | 9/2000 |

OTHER PUBLICATIONS

Patent Abstracts of Japan, May 8, 2001, NGK Insulators, abstracts: figures 1 and 4.
Patent Abstracts of Japan. May 8, 2001, NGK Insulators, abstract: figure 1.

* cited by examiner

Primary Examiner—Bao Q. Vu
(74) Attorney, Agent, or Firm—Tracy M Heims; Apex Juris, pllc

(57) ABSTRACT

A capacitor unit with plural double layer capacitors eliminating irregularity in a state of charge of the respective double layer capacitor in the capacitor unit. A capacitor unit, a capacitor unit control method, a capacitor unit control apparatus and a vehicle charging system, wherein a chargeable and dischargeable capacitor unit 1 with plural electronic double layer capacitors 11 connected in series is characterized in that electric double layer capacitors 11 in a higher state of charge is subject to discharge so that a state of charging of the respective electric double layer capacitor 11 may become approximately equal to each other.

7 Claims, 4 Drawing Sheets

CAPACITOR UNIT WITH ELECTRIC DOUBLE LAYER CAPACITORS, CONTROL METHOD AND CONTROL APPARATUS FOR THE SAME, AND ACCUMULATOR SYSTEM FOR MOTOR VEHICLES

FIELD OF THE INVENTION

This invention relates to controlling of charging and discharging of a chargeable and dischargeable capacitor unit with plural electric double layer capacitors connected in series and more particularly to controlling of charging and discharging of electric double layer capacitors to be a power source used for the purpose of improving energy efficiency of vehicles including a 12V vehicle, a 42V vehicle, an electric vehicle, and a hybrid powered vehicle and a power storage such as road leveling.

BACKGROUND OF THE INVENTION

As a conventional capacitor device for a vehicle, the 12V vehicle employs a lead battery while the hybrid powered vehicle employs a nickel metal hydride battery. Also, the lead battery and the nickel-cadmium battery have been used as the power storage.

A conventional power storage device including the lead storage battery, nickel-cadmium battery, and nickel metal hydride battery is a chemical cell utilizing chemical reaction. Accordingly, the conventional power storage devices are not suitable for high output because reaction speed relative to charging and discharging is extremely slow relative to electronic conduction and has shorter lifetime comparing with other electric and electronic components because reaction reversibility is apt to be degraded in connection with charging and discharging cycle.

SUMMARY OF THE INVENTION

An object of this invention is to improve a capacitor unit with plural double layer capacitors to eliminate irregularity in a state of charge of the respective double layer capacitor in the capacitor unit.

Another object of this invention is to downsize a discharging circuit for electric double layer capacitors.

More concretely, this invention has an advantage of its suitability in high output and its longer lifetime because capacitors utilizing electric double layers only absorb and desorb relative to charging and discharging the capacitor, thereby proving very fast reaction speed and maintaining its theoretical reversibility. However, a capacitor unit composed of plural electric double layer capacitors connected in series causes irregularity in the state of charge among the electric double layer capacitors and overcharging and degradation of the electric double layer capacitors. Accordingly, another object of this invention is to equalize the state of charge of plural electric double layer capacitors connected in series.

In order to resolve the above-problems, this invention provides a chargeable and dischargeable capacitor unit with plural electronic double layer capacitors connected in series is characterized in that electric double layer capacitors in a higher state of charge is subject to discharge so that a state of charging of the respective electric double layer capacitor may become approximately equal to each other.

This invention further provides the capacitor unit with plural electric double layer capacitors connected in series as above, wherein a state of charge of an electric double layer capacitor is calculated by the voltage of the electric double layer capacitor.

This invention still further provides a capacitor unit with plural electric double layer capacitors connected in series as above, wherein plural series circuits, each comprising an adjusting resistance and an electric switch, are parallelly connected relative to the respective electric double layer capacitor; and when an electric switch is turned on, an electric current running through the adjusting resistance is to be within an allowable range for the electric double layer capacitor.

This invention still further provides the capacitor unit with plural electric double layer capacitors connected in series as above, wherein an adjusting resistance being connected parallel to the respective electric double layer capacitor and adjusting a state of charge of the respective electric double layer capacitor is to be larger than a value dividing a rated voltage or a withstand voltage of the electric double layer capacitor by an upper limit current of wiring materials and parts.

This invention still further is the capacitor unit with plural electric double layer capacitors connected in series as above, wherein if a difference between a state of charging of an electric double layer capacitor in a highest state of charge and an average state of charge of the rest of electric double layer capacitors becomes an upper limit value or more, the electric double layer capacitor in the highest state of charge is subject to discharge and if the difference becomes a lower limit value or less, discharging of the electric double layer capacitor in the highest state of charge is suspended.

This invention still further is the capacitor unit with plural electric double layer capacitors connected in series as above, wherein if a difference between a state of charging of an electric double layer capacitor in a highest state of charge and a state of charging of an electric double layer capacitor in a lowest state of charge becomes an upper limit value or more, the electric double layer capacitor in the highest state of charge is subject to discharge and if the difference becomes a lower limit value or less, discharging of the electric double layer capacitor in the highest state of charge is suspended.

This invention further provides a control method of a chargeable and dischargeable capacitor unit with plural electronic double layer capacitors connected in series is characterized in that electric double layer capacitors in a higher state of charge is subject to discharge so that a state of charging of the respective electric double layer capacitor may become approximately equal to each other.

This invention still further provides a capacitor unit control apparatus, comprising a chargeable and dischargeable capacitor unit with plural electric double layer capacitors connected in series; a voltmeter measuring the voltage of the respective electric double layer capacitor; a series circuit having an adjusting resistance and an electric switch connected parallel to the respective electric double layer capacitor; and an electric switch control device turning the electric switch on to discharge the electric double layer capacitor, wherein an electric switch for an electric double layer capacitor in a higher state of charge is turned on to discharge the same so that a state of charging of the respective electric double layer capacitor may become approximately equal to each other.

This invention yet further is a chargeable and dischargeable capacitor system with plural electronic double layer capacitors connected in series, wherein an electric double layer capacitor in a higher state of charge is subject to discharge so that a state of charging of the respective electric double layer capacitor may become approximately equal to each other.

More concretely, a capacitor unit of this invention is characterized in that plural electric double layer capacitor calls or plural capacitor modules, each having 2 or more parallely connected capacitor cells, are connected in series, wherein adjusting reisistances $R_i$ ($\Omega$) and electric switches $SW_i$ are connected in parallel to the respective electric double layer capacitor $C_i$ as shown in FIG. 1.

At that time, the adjusting resistance $R_i$ is to be $V_i/I_o$ ($\Omega$) or more if the rated voltage or the withstand voltage of the electric double layer capacitor $C_i$ connected in parallel is $V_i$ (V) and a current value durable for electric switch $SW_i$ connected with adjusting resistances $R_i$ ($\Omega$) in series or a copper wire is $I_o$ (A). As such, downsizing of a section positioning the adjusting resistance and the electric switch becomes possible.

In this system, regardless of the state of charge, pause, and discharge, only the electric double layer capacitor connected in parallel to the adjusting resistance is discharged by turning the electric switch of the adjusting resistance $R_i$ on and off.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE INVENTION

Figure 1:
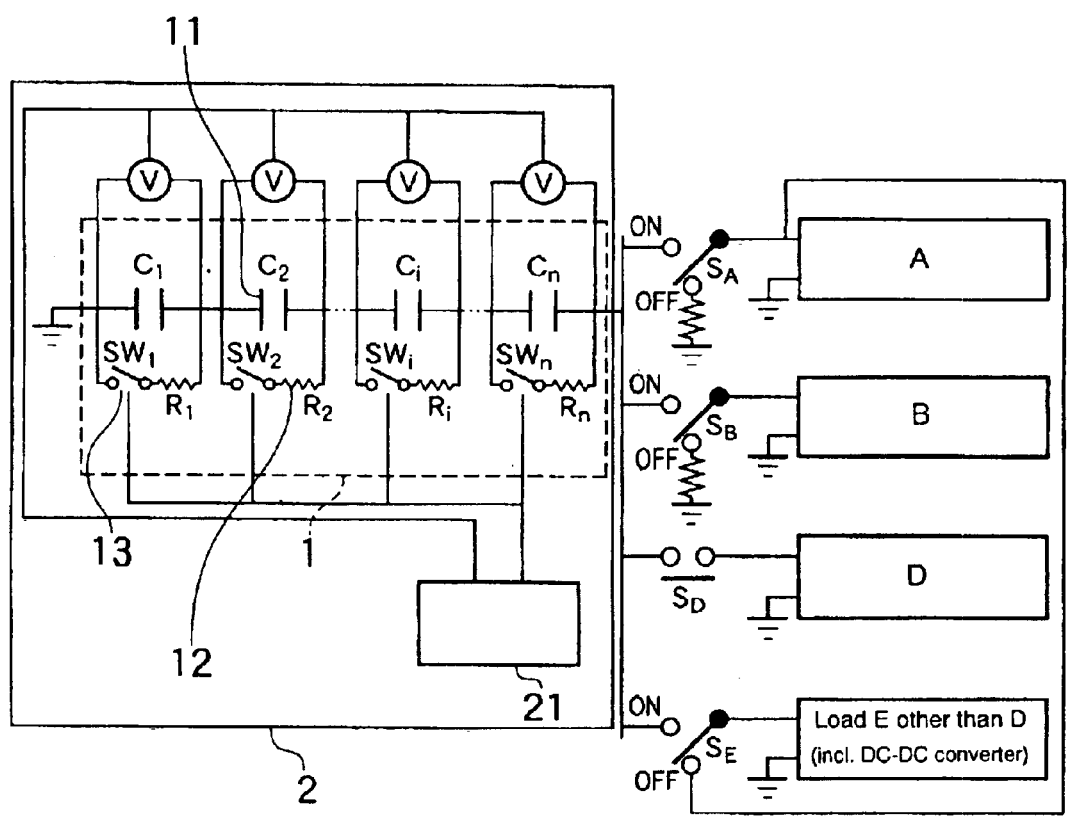
FIG. 1 is a circuit drawing of a capacitor system for a vehicle with a capacitor unit with plural connected electric double layer capacitors.

The embodiments of the invention are next described while referring to the accompanying drawings.

<A> Capacitor Unit Control Apparatus

A capacitor unit control apparatus 2 is designed to avoid irregularity in the respective state of charge of plural electric double layer capacitors 11 constituting a capacitor unit 1 and to prevent overcharging of the capacitor unit 1. For that purpose, the capacitor unit control device 2 measures voltage of the respective electric double layer capacitor 11 and controls discharging of the electric double layer capacitor 11 with higher state of charge than other electric double layer capacitors 11 by utilizing a switch control device 21.

<B> Capacitor Unit

The capacitor unit 1 comprises the electric double layer capacitors 11 connected in series. The electric double layer capacitor 11 means an electric double layer capacitor cell or a capacitor module of plural electric double layer capacitor cells arranged in parallel.

<C> Electrical Double-layer Capacitor Cell

In the electrical double-layer capacitor cell, ion conductive materials are arranged between a pair of electrode structures, and an electrical double layer is formed between a material with high surface area in the electrode structure and an electrolyte of the ion conductive material. A large surface area material is a powdery large surface area material pulling many ions thereon, and it is preferable to use activated carbon, which can be obtained from carbon material by steam activation method or by melted KOH activation process. For example palmae shell type activated carbon types, phenol type activated carbon, petroleum coke type activated carbon, and polyacene may be used as activated carbon. These materials may be used alone or in a combination of two types or more. Among those, because of a large electrostatic capacity, phenol type activated carbon, petroleum cokes type activated carbon, and polyacene are preferable <D> Measuring the State of Charge of an Electric Double Layer Capacitor The state of charge of the electric double layer capacitor 11 means a condition of an accumulated amount of electric charge, which for example may be measured by a voltmeter 22 and an ammeter. If the voltmeter 22 is used, the voltage of the electrical double layer capacitor may be measured to determine-the state of charge. For example, the voltmeter 22 may be connected between the electric double-layer capacitors. The measured value is transmitted to the switch control device 21 via a voltage measuring wire 23.

<E> Adjusting Resistance

The adjusting resistance 12 means resistance adjusting the state of charge of the electric double layer capacitor 11, wherein electricity charged in the electric double layer capacitor 11 may be discharged via the resistance. For example, the adjusting resistance 12 may parallelly be connected with the electric double layer capacitor 11. The adjusting resistance $R_i$ is to be $V_i/I_o$ ($\Omega$) or more if the rated voltage or the withstand voltage of the electric double layer capacitor $C_i$ connected in parallel is $V_i$ (V) and a current value durable for electric switch $SW_i$ connected with adjusting resistances $R_i$ ($\Omega$) in series or a copper wire is $I_o$ (A). As such, downsizing of a section positioning the adjusting resistance 12 and the electric switch 13 becomes possible.

<F> Electric Switch

The electric switch 13 is a device to switch the electric double layer capacitor 11 to discharge electricity charged therein via the adjusting resistance 12, which for example is connected with the adjusting resistance 12 in series. The switch control device 21 controls the electric switch 13 to be turned on or off via the switch control wire 24. A relay device and a thyristor may be used as the electric switch 13.

<G> Switch Control Device

The switch control device 21 measures the voltage $V_1$-$V_n$ of the respective electric double layer capacitor 11 to select the respective electric double layer capacitor 11 in a higher state of charge; turns on the electric switch 13 of the electric double layer capacitor 11 in the higher state of charge so as to discharge the accumulated electric charge; and upon the state of charging of the respective electric double layer capacitor becoming approximately equal to other electric double layer capacitors, turns off the electric switch so as to control the state of charge of the electric double layer capacitors 11.

The switch control device 21, regardless of the state of charge, pause, and discharge of the respective electric double layer capacitor 11, discharges only the electric double layer capacitor connected in parallel to the adjusting resistance $R_i$ by turning on and off the electric switch 21 of the adjusting resistance $R_i$, thereby enabling to lower the state of charge.

\<H\> Example of a Capacitor Unit

Figure 2:
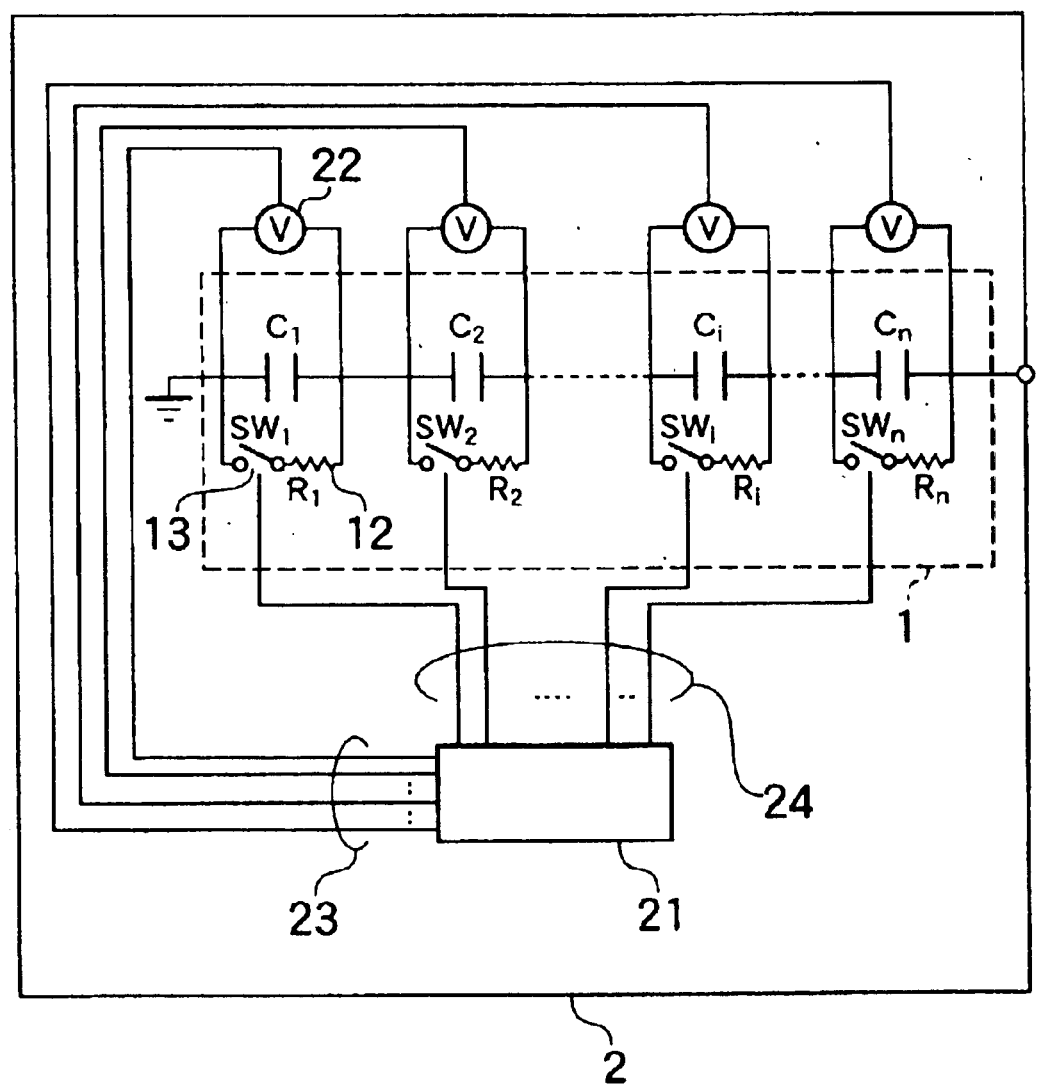
FIG. 2 is a drawing to explain a capacitor unit control device.

For example, the capacitor unit 1 may be composed of 17 electric double layer capacitor cells 11 with rated electrostatic capacity of 4,000F and rated voltage of 2.47V, all connected in series. A circuit in FIG. 2 may be designed such that the resistance of 2.47Ω and the electric switch 13 are connected in parallel with the respective electric double layer capacitor 11 utilizing wiring materials capable of flowing electric current 1A. The switch control device 21 has a voltage detecting and measuring function and may turn the electric switch 13 on and off to control the same.

\<I\> Vehicle Capacitor System

A vehicle capacitor system is an applicable system for the capacitor unit 1. The vehicle capacitor unit is a charging system for a 12V vehicle, a 42V vehicle, an electric vehicle, or a hybrid powered vehicle, which comprises a capacitor unit 1 made in combination of electrical double layer capacitor cells, at least capable of being charged by an alternator A, recharged after braking by a charger B, discharged by an engine starter D, or charged and discharged by any other load E. That is, the capacitor unit 1 may employ one type of charging and discharging means or plural types of charging and discharging means. This construction satisfies necessary conditions for a power supply of a vehicle, for example conditions of voltage and electric current relative to the engine start and other electric devices and conditions of charging by an alternator and recharging by braking.

In the following section, a procedure of equalizing the state of charge of the electric double layer capacitors is disclosed.

\<A\> Measuring the State of Charge of the Electric Double Layer Capacitor

Figure 3:
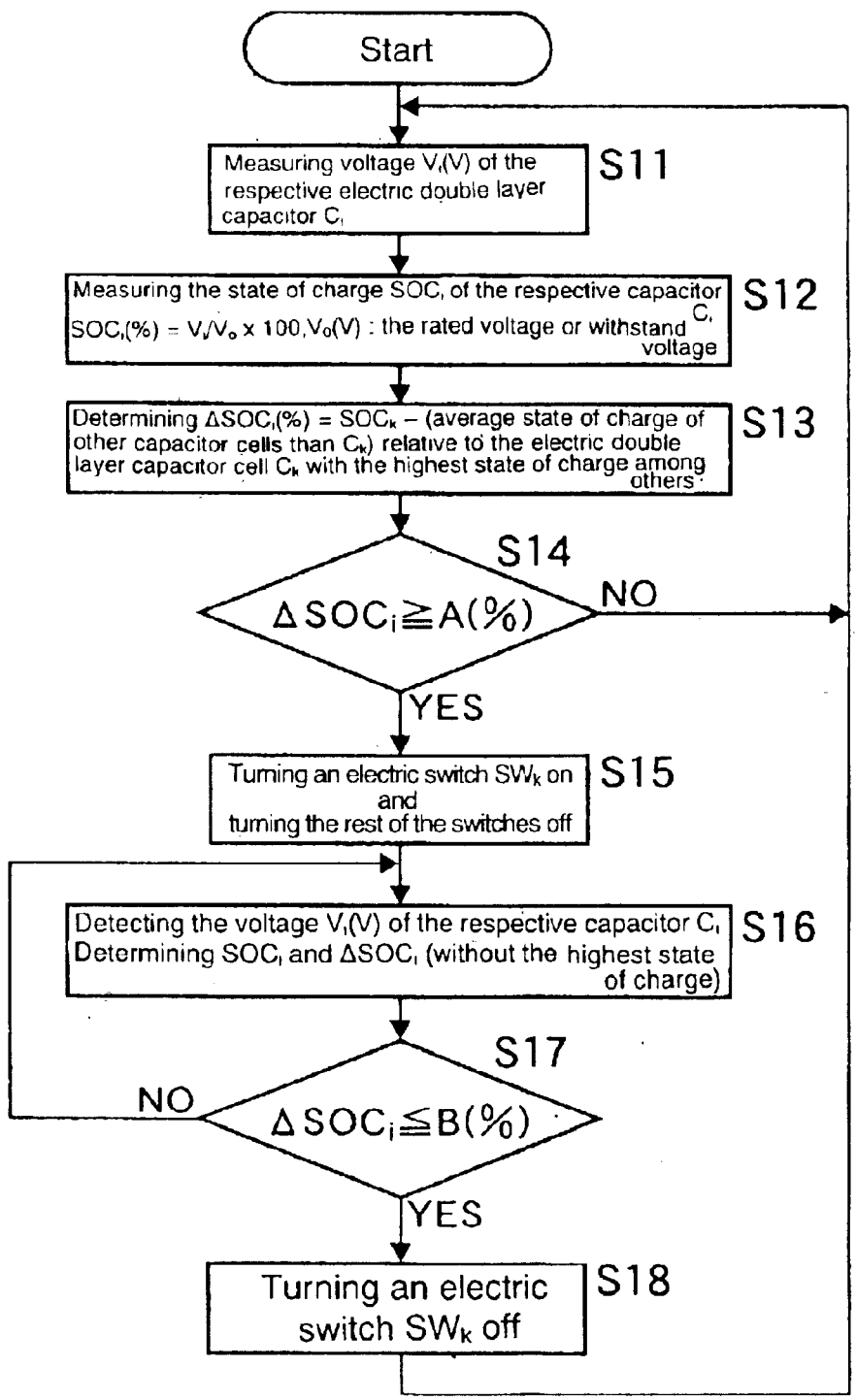
FIG. 3 is a flowchart of a process in reducing irregularity of a state of charge of the respective electric double layer capacitor.

According to a flowchart shown in FIG. 3, voltage V of the respective electric double layer capacitor $C_i$ is measured while charging and discharging (which is shown as S11); the state of charge $SOC_i$ (%) of the respective capacitor $C_i$ is measured by the rated voltage or withstand voltage $V_o(V)$ of the electric double layer capacitor 11, i.e., $SOC_i(\%)=V_i(V)/V_o(V)\times 100$ (which is shown as S12) Accordingly, the state of charge of the respective electric double layer capacitor $C_i$ is measured.

Then, "i" with a highest state of charge within $SOC_i$, is determined and is expressed as $C_k$. Irregularity $\Delta SOC_i$ (%) of $C_l$, i.e., a difference between the state of charge $SOC_k$ of the electric double layer capacitor cell $C_k$ with the highest state of charge and average state of charge of other capacitor cells, is determined by $\Delta SOC_i(\%)=SOC_k(\%)-(\Sigma SOC_k - SOC_k)/(n-1)$ (which is shown as S13).

\<B\> Discharging Control of the Electric Double-layer Capacitor

If the irregularity $\Delta SOC_i$ (%), is a threshold value A (%) or more, for example 30% or more (as shown in S14), the electric switch $SW_k$ is turned on (and the rest of switches are turned off) (as shown in S15). Voltage $V_i$ of the respective electric double layer capacitor $C_i$ and the state of charge $SOC_i$, are measured without determining whether the state of charge $SOC_k$ of the electric double layer capacitors $C_k$ is the highest state; and $\Delta SOC_i$ relative to "k" is determined even if the electric double layer capacitor $C_k$ is discharged and the state of charge $SOC_k$ becomes non-highest state (as shown in S16). If the irregularity $\Delta SOC_i$ (%) is a threshold value B (%) which is lower than A (%) or lower (as shown in S17), the electric switch $SW_k$ is turned off (as shown in S18) and the process goes back to an initial step in the flowchart of FIG. 3 to repeat detection and control.

Figure 4:
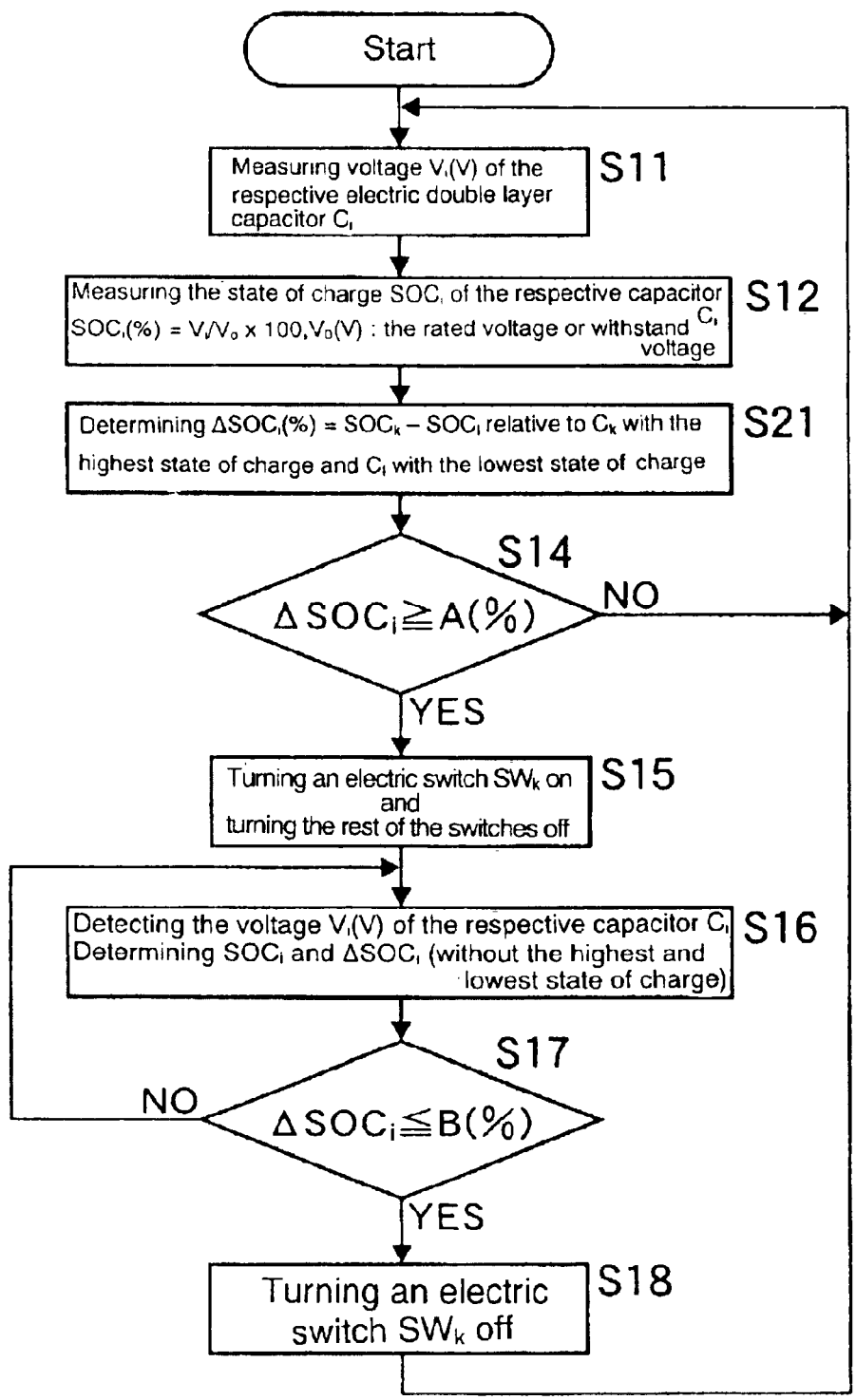
FIG. 4 is another flowchart of a process in reducing irregularity of a state of charge of the respective electric double layer capacitor.

\<C\> Another way of Discharging Control of the Electric Double Layer Capacitor According to a control flowchart in FIG. 4, "i" with a highest state of charge within $SOC_i$, is determined and is expressed as $C_k$; and "i" with a lowest state of charge within $SOC_l$ is determined and is expressed as $C_l$ (as shown in S21). Same reference numbers in the identical steps of the flowchart of FIG. 3 are placed on a flowchart of FIG. 4. Irregularity $\Delta SOC_l$ (%) of $C_l$, i.e., a difference between the highest state of charge $SOC_k$ and the lowest state of charge $SOC_l$ (%), is determined by $\Delta SOC_i(\%)=SOC_k(\%)-SOC_l$ (which is shown as S21).

If the irregularity $\Delta SOC_i$ (%) is a threshold value A (%) or more, for example 30% or more (as shown in S14), the electric switch $SW_k$ is turned on (and the rest of switches $SW_i$ are turned off) (as shown in S15). Voltage $V_i$ of the respective electric double layer capacitor $C_i$ and the state of charge $SOC_l$ and $\Delta SOC_i$ are measured without determining whether the state of charge $SOC_k$ of the electric double layer capacitors $C_k$ is the highest state (as shown in S16). Even if the electric double layer capacitor $C_k$ is discharged and the state of charge $SOC_k$ becomes non-highest state, the irregularity $\Delta SOC_i$ (%) determined relative to "k" is a threshold value B (%), which is lower than the threshold value A, or lower (as shown in S17), the electric switch $SW_k$ is turned off (as shown in S18) and the process goes back to an initial step in the flowchart of FIG. 4 to repeat detection and control.

Accordingly, this invention, as described above, renders the advantages to improve a capacitor unit with plural double layer capacitors to eliminate irregularity in a state of charge of the respective double layer capacitor in the capacitor unit and also to downsize a discharging circuit for electric double layer capacitors.

It is readily apparent that the above-described also has the advantages of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

I claim:

1. A chargeable and dischargeable capacitor unit with plural electronic double layer capacitors connected in series, wherein
   when a difference between a highest state of charge among said electric double layer capacitors and a state of charge of the remaining electric double layer capacitor or capacitors exceeds a predetermined value, said electric double layer capacitor in the highest state of charge is subject to discharge regardless of a state of charge, discharge and pause of the respective electric double layer capacitor so as to average said state of charge of the respective electric double layer capacitor.

2. The capacitor unit according to claim 1, wherein
   said state of charge of the electric double layer capacitor is calculated based on the voltage of the electric double layer capacitor.

3. The capacitor unit according to claim 1, wherein
   plural series circuits, each comprising an adjusting resistance and an electric switch that are connected in series, are connected in parallel to the respective electric double layer capacitor; and when an electric switch is turned on, an electric current running through the adjusting resistance stays within a range that electric parts other than said electric double layer capacitor can withstand.

4. The capacitor unit according to claim 1, wherein said adjusting resistance, which is connected parallel to the respective electric double layer capacitors and adjusts the state of charge of the respective electric double layer capacitors, is to be larger than a value determined after dividing a rated voltage or a withstand voltage of the electric double layer capacitor by an upper limit current of wiring materials and parts.

5. The capacitor unit according to claim 1, wherein if a difference between the state of charge of an electric double layer capacitor in a highest state of charge and an average state of charge of the rest of electric double layer capacitors exceeds a predetermined upper limit, the electric double layer capacitor in the highest state of charge is subject to discharge and if the difference underperforms a lower limit, discharging of the electric double layer capacitor in the highest state of charge is suspended.

6. The capacitor unit according to claim 1, wherein if a difference between the state of charge of the electric double layer capacitor in a highest state of charge and a the state of charge of an electric double layer capacitor in a lowest state of charge exceeds a predetermined upper limit, the electric double layer capacitor in the highest state of charge is subject to discharge and if the difference underperforms a lower limit, discharging of the electric double layer capacitor in the highest state of charge is suspended.

7. A capacitor unit control apparatus, comprising:

the chargeable and dischargeable capacitor unit according to claim 1;

a voltmeter measuring the voltage of the respective electric double layer capacitor;

a series circuit, which has an adjusting resistance and an electric switch connected in series and is parallel to the respective electric double layer capacitor; and an electric switch control device for turning the electric switch on to discharge the electric double layer capacitor, wherein said electric switch for the electric double layer capacitor in a highest state of charge is turned on to be discharged so as to average the state of charge of the respective electric double layer capacitor.

* * * * *